United States Patent [19]

Hauser et al.

[11] Patent Number: 4,513,975
[45] Date of Patent: Apr. 30, 1985

[54] THERMALLY RESPONSIVE LABYRINTH SEAL

[75] Inventors: Ambrose A. Hauser, Wyoming; Rolf R. Hetico, Cincinnati, both of Ohio; Thomas G. Wakeman, Greendale, Ind.

[73] Assignee: General Electric Company, Cincinnati, Ohio

[21] Appl. No.: 604,561

[22] Filed: Apr. 27, 1984

[51] Int. Cl.³ .............................................. F16J 15/44
[52] U.S. Cl. .......................................... 277/22; 277/53; 277/74; 277/75; 415/174; 415/180
[58] Field of Search ................ 277/22, 1, 53, 55, 59, 277/70, 71, 72 R, 72 FM, 74, 75, 79; 415/170 R, 415/174, 180

[56] References Cited

U.S. PATENT DOCUMENTS

| 2,159,766 | 5/1939 | Larrecq . | |
|---|---|---|---|
| 3,527,053 | 9/1970 | Horn | 415/180 X |
| 3,823,950 | 7/1974 | Pedersen | 277/53 X |
| 3,825,364 | 7/1974 | Halila et al. | 277/53 X |
| 3,846,899 | 11/1974 | Gross | 277/53 X |
| 4,222,706 | 9/1980 | Ayache et al. | 415/174 X |
| 4,320,903 | 3/1982 | Ayache et al. | 415/174 X |

FOREIGN PATENT DOCUMENTS

| 875365 | 7/1971 | Canada | 277/53 |
|---|---|---|---|
| 45-613 | 10/1970 | Japan . | |
| 355462 | 8/1961 | Switzerland | 415/180 |
| 2033021 | 5/1980 | United Kingdom | 415/174 |
| 785576 | 12/1980 | U.S.S.R. . | |
| 811028 | 3/1981 | U.S.S.R. . | |
| 830064 | 5/1981 | U.S.S.R. . | |

Primary Examiner—Robert S. Ward
Attorney, Agent, or Firm—Douglas S. Foote; Derek P. Lawrence

[57] ABSTRACT

An improved rotary labyrinth seal such as may be used in a gas turbine engine. The seal includes a rotor with at least one seal tooth and a stator with an abradable shroud and casing. The first and second members cooperate to inhibit the flow of fluid therebetween. The improvement comprises a conduit for conducting a portion of the fluid through the casing for heat transfer between the fluid and second member. In this manner, the thermal response of the stator is improved.

6 Claims, 2 Drawing Figures

THERMALLY RESPONSIVE LABYRINTH SEAL

This invention relates generally to rotary seals and, more particularly, to rotary labyrinth seals for use in gas turbine engines.

BACKGROUND OF THE INVENTION

Labyrinth type rotary seals generally comprise two relatively rotatable members. One such member typically includes one or more circumferential teeth which are coaxially positioned with respect to a circumferential sealing surface on the second member. Seals of this type are used to restrict fluid flow between cavities formed by stationary and rotating members without impeding the rotational movement of the rotating member.

A disadvantage of seals of this type occurs when the temperature of the fluid leaking through the seal undergoes a rapid change, such as during transient operating conditions. Typically, one member responds quickly to the change in temperature resulting in thermally induced radial growth. At the same time, the other member heats more slowly thereby thermally growing at a slower rate. Many factors may contribute to the different rates of thermal response of the two members. For example, an abradable shroud on the flow path surface of the stationary member may utilize a material with a lower coefficient of thermal conductivity than the material of the rotating member.

At equilibrium operating temperature, the separation or gap between rotating and stationary members is designed to be fixed at a typically small value. However, even at equilibrium, this gap can vary with temperature changes on the back side of the stationary seal.

During transient conditions when the fluid is changing temperature rapidly, the differential growth between rotating and stationary members may result in a rub therebetween. Such rubs result in the wearing down of the stationary seal surface or circumferential teeth which increase clearance at steady state operation. Increased clearance degrades seal performance.

OBJECTS OF THE INVENTION

It is an object of the present invention to provide a new and improved rotary seal.

It is another object of the present invention to provide a new and improved rotary labyrinth seal with reduced rubs occurring therein during thermal transient operation.

It is a further object of the present invention to provide a new and improved method and means in a rotating labyrinth seal for increasing the thermal response of one of the members.

SUMMARY OF THE INVENTION

The present invention is an improvement for a rotary seal in which a first member with at least one seal tooth cooperates with a second member to inhibit the flow of fluid therebetween. The second member includes an abradable shroud and casing. The improvement comprises a conduit for conducting a portion of the fluid through the casing for heat transfer therebetween.

DETAILED DESCRIPTION OF THE INVENTION

Figure 1:
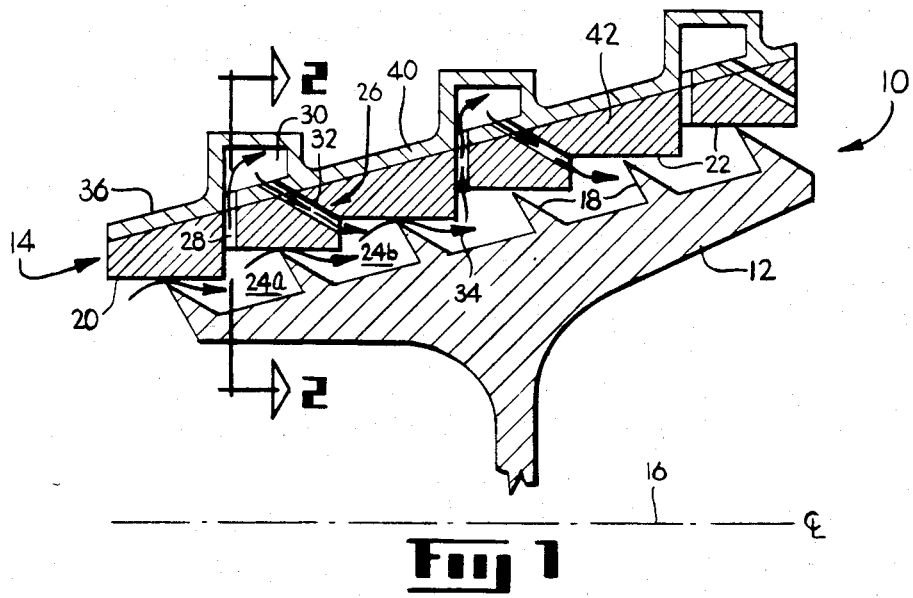
FIG. 1 is a view of rotary labyrinth seal according to one form of the present invention.

A rotary seal 10 of the labyrinth type is shown in FIG. 1. Such labyrinth seals have wide application and are particularly adaptable for use in gas turbine engines. Seal 10 includes a rotor or first member 12, generally disk shaped, and a stator or second member 14, generally annular shaped. First member 12 is relatively rotatable with respect to second member 14. In the embodiment shown, first member 12 rotates about engine center line 16 and second member 14 is fixed.

First member 12 includes a plurality of seal teeth 18 which extend generally radially outwardly towards inner surface 20 of second member 14. Each tooth 18 is integral with first member 12 and is generally ring shaped.

Second member 14 includes a casing 40 and an abradable shroud 42. Shroud 42 includes a number of steps 22 so that one seal tooth 18 corresponds to the inner facing surface 20 of each step 22. The stepped configuration of second member 14 is exemplary and it should be clear to those skilled in the art that other geometric configurations for second member 14 are possible. The configuration, thus described, defines a number of regions 24a, 24b, . . . bounded by inner surface 20 of second member 14 and adJacent seal teeth 18 of first member 12. Casing 40 includes a radially outward facing surface 36.

Figure 2:
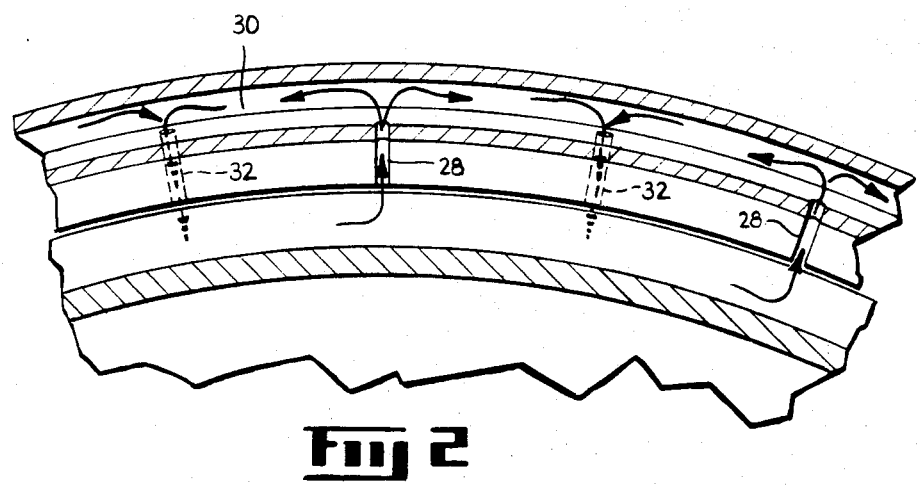
FIG. 2 is a view taken along the line 2—2 in FIG. 1.

Second member 14 also includes a conduit 26 joining regions 24a and 24b. As shown in FIG. 1 and in more detail in FIG. 2, conduit 26 includes an annular cavity 30 in thermal contact with surface 36, a plurality of first passages 28 connecting region 24a with cavity 30, and a plurality of second passages 32 connecting cavity 30 with region 24b. In a preferred embodiment, first passages 28 are circumferentially offset with respect to second passages 32.

In a further embodiment (not shown), conduit 26 may connect non-adjacent regions. For example, fluid taken from region 24a might pass into a cavity 30 and then be conducted into region 24c, 24d, or subsequent region. This would have the advantage of a larger pressure drop between regions resulting in a more positive flow of fluid therebetween.

In operation, first member 12 cooperates with second member 14 to inhibit the flow of fluid therebetween. Thus, fluid 34, as shown by the arrow, will be inhibited from flowing from region 24a to region 24b. During steady state operating conditions wherein the temperature of fluid 34 is generally stable, a gap or separation between seal tooth 18 and surface 20 allows the leakage of some fluid. However, during transient conditions wherein the temperature of fluid 34 is changing, first and second members 12 and 14 experience thermal growth. Due to the different thermal constants of members 12 and 14, such growth will be differential. For example, abradable shroud 42 may reduce the ability of casing 40 to radially grow at the same rate as first member 12. Such differential growth may result in rubs resulting in degradation of the tooth 18/surface 20 interface, thereby increasing the gap during steady state conditions.

Conduit 26 is designed to conduct a portion of fluid 34 through second member 14 from region 24a to region 24b for increasing the rate of heat transfer between fluid 34 and second member 14. For example, as the heat of fluid 34 increases, fluid passing through conduit 26 helps second member 14 to heat more rapidly. Furthermore, the positioning of cavities 30 provide generally uniform heating to second member 14. By increasing the heat transfer area of second member 14, the rate of heat transfer between member 14 and fluid 34 is increased and the time at which equilibrium temperature therebetween is decreased. It should be noted that as fluid 34 passes from region 24a to region 24b through the gap between seal tooth 18 and surface 20, a pressure drop occurs. Region 24b will therefore be at a lower pressure than region 24a and this differential pressure will induce the flow of fluid through conduit 26.

It should be noted that surface 36 of casing 40 is normally exposed to cooling air or at least air at a different ambient temperature than fluid 34. Thus, even at steady state engine operating conditions, the flow of fluid through conduit 26 will affect the gap. As a result, the conduction of fluid 34 through casing 40 changes the thermal response of second member 14 at all engine operation conditions.

It will be clear to those skilled in the art that the present invention is not limited to the specific embodiment disclosed and illustrated herein. Nor is the invention limited to rotary labyrinth seals in gas turbine engines. Rather, the invention may be applied equally to seals in any rotary machine. Further, the invention includes methods for increasing the rate of heat transfer between fluid and one seal member, and for decreasing the time at which thermal equilibrium between seal members is reached.

It will be understood that the dimensions and proportional and structural relationships shown in the drawings are illustrated by way of example only and those illustrations are not to be taken as the actual dimensions or proportional structural relationships used in the rotary seal of the present invention.

Numerous modifications, variations, and full and partial equivalents can be undertaken without departing from the invention as limited only by the spirit and scope of the appended claims.

What is desired to be secured by Letters Patent of the United States is as follows.

What is claimed is:

1. In a rotary seal including a first member with at least one ring shaped seal tooth and a second member with an abradable shroud and casing, wherein said members cooperate to inhibit flow of fluid from a first region to a second region, the improvement comprising:
   a conduit for conducting a portion of said fluid through said casing from said first to said second region for heat transfer between said fluid and said casing.

2. In a rotary labyrinth seal including a rotor with at least one seal tooth and a stator with abradable shroud and casing, wherein said rotor and stator cooperate to inhibit the flow of fluid from a first region to a second region, the improvement comprising:
   a conduit for conducting a portion of said fluid through said casing from said first to said second region for heat transfer between said fluid and said casing.

3. In a rotary labyrinth seal including a rotor with at least one seal tooth, and a radially outwardly disposed stator with an abradable shroud and casing, said casing having a radially outward facing surface, wherein said rotor and stator cooperate to inhibit the flow of fluid from a first region to a second region, the improvement comprising:
   a conduit for conducting a portion of said fluid through said casing from said first to said second region for heat transfer between said fluid and said stator.

4. The improvement, as recited in claim 3, wherein said conduit includes:
   an annular cavity in thermal contact with said surface;
   a plurality of first passages connecting said first region with said cavity; and
   a plurality of second passages connecting said cavity with said second region.

5. The improvement, as recited in claim 4, wherein said first passages are circumferentially offset with respect to said second passages.

6. In a rotary labyrinth seal for a gas turbine engine including a first member with at least one seal tooth and a second member with an abradable coating, said tooth and coating cooperating to inhibit the flow of fluid from a first region to a second region, and wherein the thermal growth of said second member is limited by the coefficient of thermal conductivity of said coating, a method for improving the thermal response of said second member comprising:
   increasing the heat transfer rate of said second member by conducting a portion of said fluid through said second member from said first to said second region.

* * * * *